Sept. 6, 1955 J. W. ANDREWS ET AL 2,717,072
STOCK DRAWING APPARATUS
Filed Feb. 12, 1951 5 Sheets-Sheet 1

INVENTOR.
JOSEPH W. ANDREWS
OTTO R. SCHULER
BY
Whittemore Hulbert & Belknap
ATTORNEYS Sept. 6, 1955

J. W. ANDREWS ET AL 2,717,072

STOCK DRAWING APPARATUS

Filed Feb. 12, 1951

INVENTOR.
JOSEPH W. ANDREWS
OTTO R. SCHULER

BY Whitemore Hulbert & Belknap
ATTORNEYS

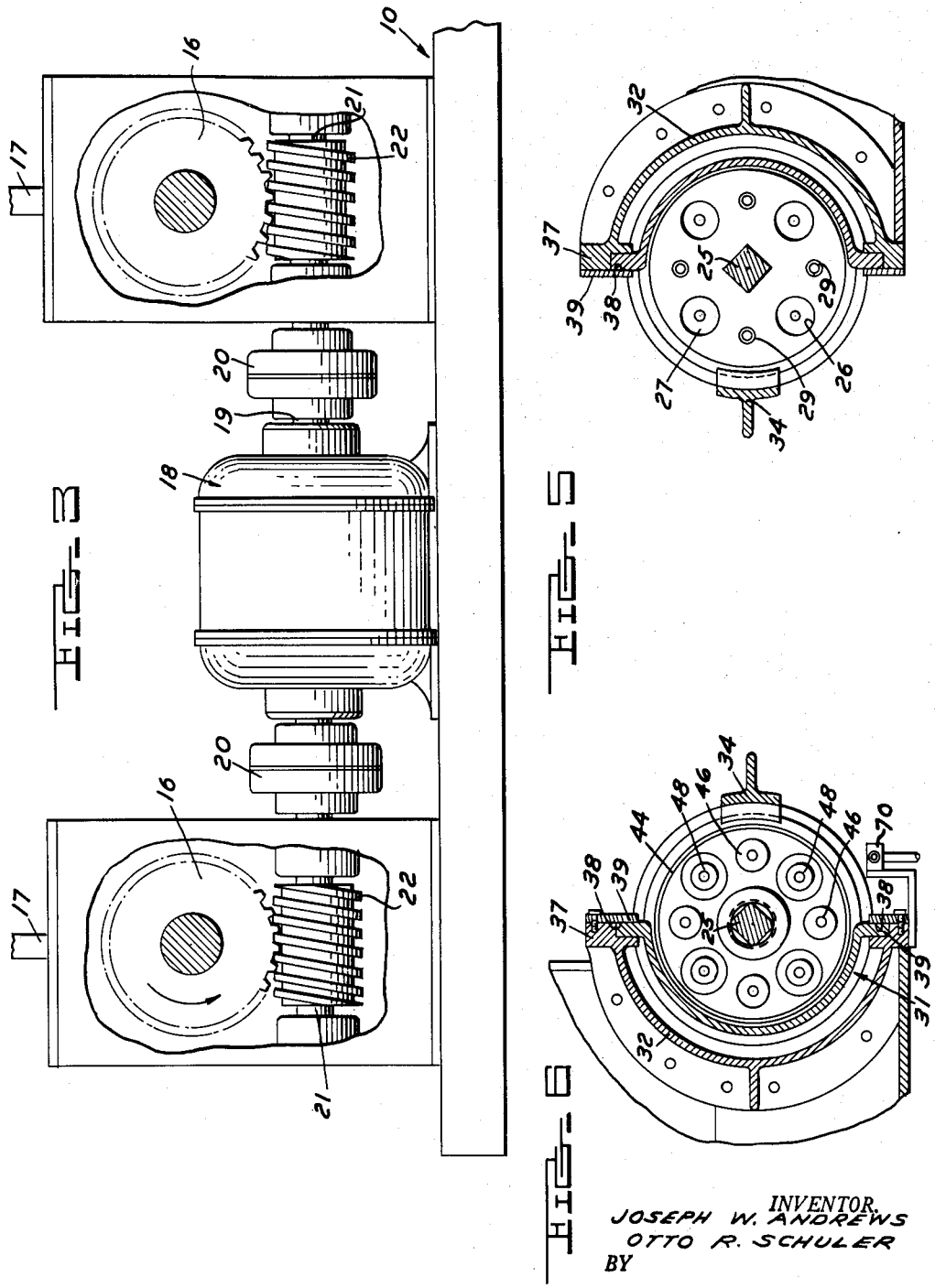

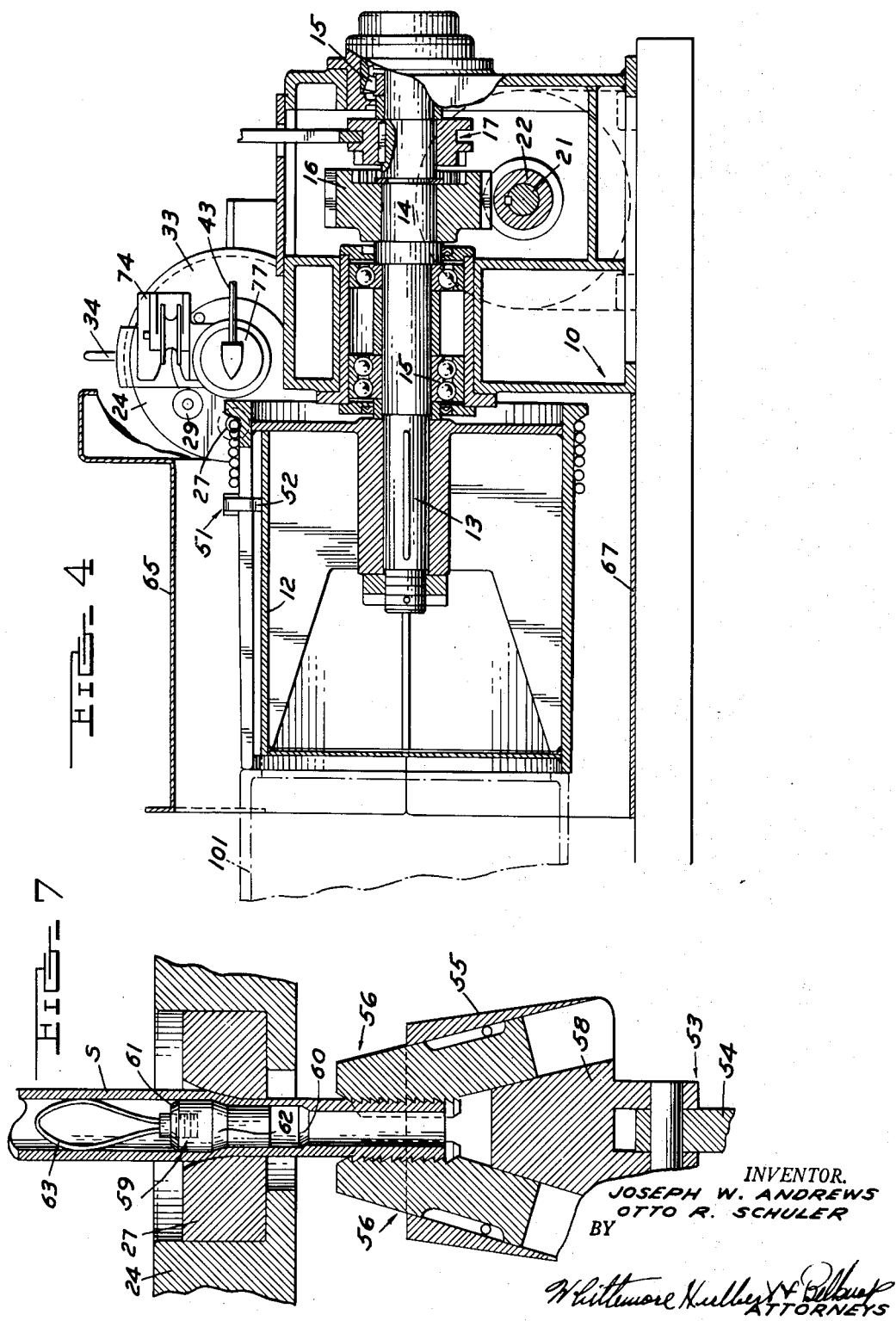

Sept. 6, 1955   J. W. ANDREWS ET AL   2,717,072
STOCK DRAWING APPARATUS
Filed Feb. 12, 1951   5 Sheets-Sheet 5

INVENTOR.
JOSEPH W. ANDREWS
OTTO R. SCHULER
BY
Whittemore Hulbert & Belknap
ATTORNEYS

United States Patent Office 2,717,072
Patented Sept. 6, 1955

2,717,072

STOCK DRAWING APPARATUS

Joseph W. Andrews, Birmingham, and Otto R. Schuler, Detroit, Mich., assignors to Calumet & Hecla, Inc., a corporation of Michigan Application February 12, 1951, Serial No. 210,602

11 Claims. (Cl. 205—3)

This invention relates generally to apparatus for drawing stock and refers more particularly to improvements in apparatus for reducing the diameter of tubular stock by successive drawing operations.

It has been proposed to draw tubes or stock in straight lengths by the use of draw benches having a die and a carriage movable along a straight length of track for drawing stock through the die. Drawbenches of the above general type are objectionable in that they not only require a considerable amount of space and handling of the stock, but in addition, limit the length of stock capable of being drawn.

In order to overcome the limitation on the length of stock capable of being drawn, a machine commonly known to the trade as a "bull block" is frequently used. Briefly this machine usually comprises a stock supporting idler reel, a power driven drum and a draw die positioned between the reel and drum. The idler reel serves as a support for a coil of tubing or stock, and provision is made for attaching one end of the stock to the power driven drum after the end of the stock is forced through the die. Thus rotation of the drum draws the stock off of the reel through the draw die and coils the reduced stock onto the drum. Upon completion of the above operation, it is necessary to remove the coil of stock from the drum and to transfer the stock to another "bull block." This operation is repeated until the tube or stock is reduced to its specified size.

While in some respects the use of the "bull block" method of drawing overcomes some of the deficiencies of the drawbench method of drawing, nevertheless, it has certain definite shortcomings. For example, considerable handling of the coils is required to complete the various draws, and the weight of the coils is usually such as to necessitate the provision of special equipment for handling the coils. Also the coils are awkward to handle, and unless extreme care is taken, the convolutions of the coils become disarranged or tangled as they are transported from one machine to another. In practice it has been found that handling the coils between successive draws often consumes more time than the actual drawing operation, and this is of course objectionable where drawn tubing or stock is produced on a production basis.

With the above in view, it is an object of this invention to eliminate the disadvantages of both methods of drawing briefly noted above by eliminating entirely the necessity of handling the stock between successive draws. In accordance with this invention any number of draws may be quickly made on a single machine, and the stock is removed from the machine only after the final draw is completed.

It is another object of this invention to provide drawing apparatus having alternately driven drums equipped with means for alternately attaching the ends of a length of stock thereto, and having draw dies of different sizes successively movable into engagement with the portion of the stock extending between the drums. Thus rotation of one drum in one direction draws stock off the other drum through the die in registration with the work and coils the stock on the said one drum. After the stock is coiled on the said one drum, a smaller die is registered with the stock and the other drum is rotated in a direction opposite the direction aforesaid to draw the stock off the said one drum through the die and recoil the stock on the other drum. This procedure is repeated until the stock is reduced to its specified diameter; and then and only then, is it removed from the apparatus.

It is still another object of this invention to provide means for alternately gripping the ends of the stock and for forcing the stock axially through the particular draw die in registration with the stock.

The foregoing as well as other objects will be made more apparent as this description proceeds, especially when considered in connection with the accompanying drawings, wherein:

Figure 2 is a plan view partly in section of the apparatus shown in Figure 1;

Figure 3 is a sectional view taken on the line 3—3 of Figure 2;

Figure 4 is a sectional view taken on the line 4—4 of Figure 2;

Figure 5 is a sectional view taken on the line 5—5 of Figure 2;

Figure 6 is a sectional view taken on the line 6—6 of Figure 2;

Figure 7 is a fragmentary sectional view illustrating one phase in the drawing operation;

Figure 8:
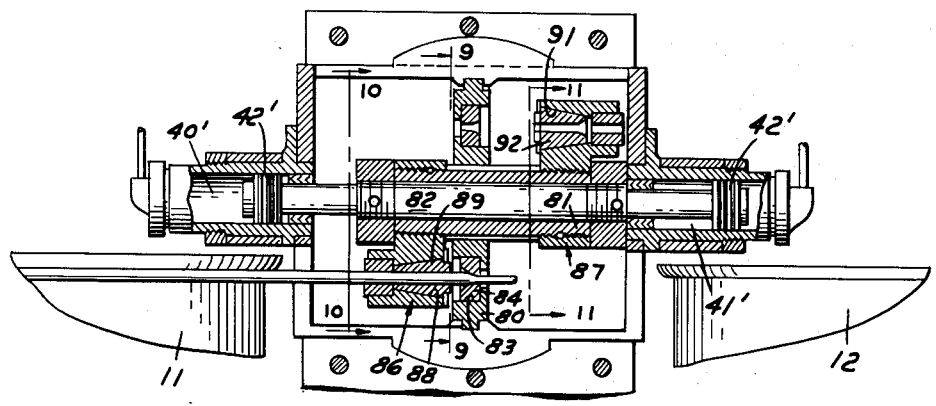
Figure 8 is a sectional view of a modified form of construction.
Figure 9:
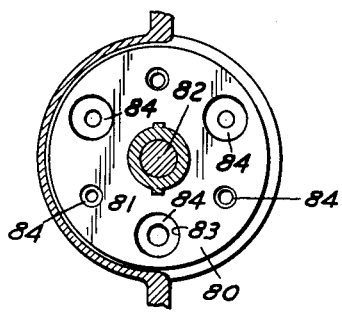
Figure 10:
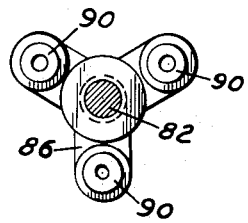
Figure 11:
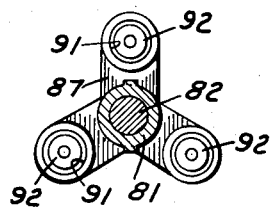

Figures 9, 10 and 11 are respectively cross sectional views taken on the lines 9—9, 10—10 and 11—11 of Figure 8.

The drawing apparatus selected herein for the purpose of illustrating the invention has a frame 10 and a pair of drums 11 and 12 supported in spaced side by side relationship on the frame 10 for rotation about substantially parallel axes. As shown in Figures 3 and 4 the drums are respectively keyed or otherwise secured to shafts 13 having corresponding ends 14 journalled in bearings 15 mounted on the frame 10. A pair of worm gears 16 are respectively mounted on the ends 14 of the shafts 13 for rotation relative to the shafts, and are selectively secured to the shafts 13 by suitable clutches 17. The clutches 17 are either manually or automatically operated by any suitable mechanism, not shown herein.

For driving the worm gears 16 in the same direction, an electric motor 18 is secured to the frame 10, and is provided with a drive shaft 19 which extends beyond opposite ends of the motor housing. Particularly satisfactory results have been obtained by employing a direct current reversible motor of the type embodying a dynamic clutch, so that when the circuit to the motor is broken, the drive shaft 19 is immediately braked or stopped. In any case the opposite ends of the drive shaft 19 are respectively connected by couplings 20 to axially aligned shafts 21. Suitable worms 22 are respectively secured to the shafts 21 in positions to respectively mesh with the worm gears 16. The arrangement is such that when the clutches 17 are engaged, the drums 11 and 12 are rotated in the same direction at a reduced speed by the motor 18, and the drums are rotated in the opposite direction by reversing the electric motor 18. In this connection it is further pointed out that the clutches 17 may be independently operated with the result that the drums 11 and 12 may be alternately rotated in opposite directions.

As shown in Figures 2, 5 and 6 of the drawings, a pair of circular carriers 23 and 24 are supported in alignment between the drums 11 and 12. The carrier 23 is supported adjacent the drum 11 on a rotatable shaft 25 having its axis extending at substantially right angles to the axes of the drums; and the carrier 24 is secured on the rotary shaft 25 adjacent the drum 12. Each carrier is formed with a plurality of circumferentially spaced openings 26 through the peripheral portion thereof, and a draw die 27 is secured in each opening 26. It will also be noted that each carrier has additional openings 28 respectively located between adjacent openings 26, and suitable guide bushings 29 are respectively secured in the openings 28.

As shown particularly in Figure 2 of the drawings, the carriers are mounted on the shaft 25 in a manner such that the entrant ends of the draw dies 27 on the carriage 23 face the drum 12, and the entrant ends of the draw dies 27 on the carrier 24 face the drum 11. It will also be noted from Figure 2 of the drawings that the shaft 25 is so positioned with respect to the corresponding ends 30 of the drums that the draw dies on both carriers may be successively positioned in alignment with the stock S extending between the ends 30 of the drums. This is of course also true with respect to the guide bushings 29 in the carriers, and the purpose of such an arrangement will become apparent as this description proceeds.

It is also pointed out at this time that the carriers are secured to the shaft 25 in such angular relationship that the guide bushings 29 on one carrier are respectively aligned with the draw dies 27 on the other carrier. Thus the dies 27 on one carrier alternate with the dies 27 on the other carriage; and in the present instance, alternate dies on the two carriers progressively decrease in size. With such an arrangement it is possible to progressively reduce the size of the stock by successive drawing operations, and this is accomplished by merely indexing the shaft 25 in timed relation to alternate rotation of the drums in opposite directions, as will be more fully hereinafter set forth.

Referring again to Figure 2 of the drawings, it will be noted that the shaft 25 is rotatably supported by a cage type mounting 31 having an arcuate side wall 32 (Figures 5 and 6) concentric with the shaft 25 and having circular end walls 33 apertured as at 34 to provide ample clearance for passage of the stock S. As shown in Figures 5 and 6 of the drawings, the front side of the cage is open, and the cage is reinforced by a cross member 34 which extends between the end walls 33 opposite the wall 32. The arcuate side wall 32 and the member 34 are fashioned with recesses 35 at opposite ends of the cage, and these recesses are concentric with the axis of the shaft 25. As shown in Figure 2 of the drawings, the recesses 35 respectively receive annular peripheral flanges 36 on the carriers, and serve to locate the carriers in axial spaced relationship on the shaft 25.

The cage is supported on the frame 10 by a semi-cylindrical cap part 37 shown in Figures 5 and 6 of the drawings as secured to the frame 10 midway between the drums 11 and 12. Referring now to Figure 2 of the drawings, it will be noted that the portions of the cap 37 at diametrically opposite sides of the axis of the shaft 25 is provided with arcuate recesses 38 having a common radius lying on the axis of the shaft 25. The recesses 38 respectively receive correspondingly curved projections 39 respectively extending from the top and bottom edges of the side wall 32 of the cage. The purpose of this construction is to permit pivotal movement of the carriers about an axis perpendicular to the shaft 25 and thereby enable the draw dies to align themselves with the path of travel of the stock S during operation of the apparatus.

Referring again to Figure 2 of the drawings, it will be noted that a pair of cylinders 40 and 41 are respectively secured to the end walls 33 of the mounting cage 31 in axial alignment with the shaft 25. The adjacent inner ends of the cylinders are open and extend through openings in the end walls 33 in a manner such as to permit opposite ends of the shaft 25 to respectively project into the cylinders. Suitable pistons 42 are respectively slidably supported in the cylinders, and are rotatably connected to the adjacent ends of the shaft 25. The pistons are actuated to reciprocated the shaft 25 by alternatively admitting fluid under pressure to and exhausting fluid under pressure from the outer ends of the cylinders through conduits 43. Any suitable manual or automatic control system may be provided for controlling the flow of fluid under pressure to the cylinders.

It is pointed out at this time that the intermediate portion of the shaft 25 is polygonally shaped in cross section and the openings through the central portions of the carriers are correspondingly shaped to slidably receive the shaft 25. Thus the carriers rotate as a unit with the shaft 25, but permit reciprocable movement of the shaft relative thereto. As a result of reciprocating the shaft 25 relative to the carriers, an end of the stock S is forcibly projected through a registering draw die on one of the other of the carriers during initial operation of the apparatus. In order to accomplish the above result, a plate 44 is secured to the shaft 25 between the carriers 23 and 24. The plate 44 is formed with a plurality of openings 45 extending axially through the peripheral portion thereof and having the side walls converging in a direction toward the drum 11. The openings 45 correspond in number and circumferential spacing to the openings 26 in the die carrier 24, and each opening 45 forms a support for coacting relatively movable clamping jaws 46. The jaws 46 are tapered as shown in Figure 2 of the drawings, so that axial movement of the plate toward the carrier 24 serves to operate the jaws engaged with the stock and to clamp the stock thereto. The plate 44 is formed with addition circumferentially spaced axially extending openings 47 having the side walls converging in a direction toward the drum 12. Each opening 47 provides a support for coacting gripping jaws 48 having the outer surfaces tapered in a direction corresponding to the direction of taper of the walls of the openings 47. The number and spacing of the openings 47 correspond to the number and spacing of the openings 26 in the die carrier 23 to enable successively engaging the gripping jaws 48 in the respective openings 47 with the stock projecting through any one of the draw dies 27 on the carrier 23. The arrangement is such that axial movement of the plate 44 in a direction toward the carrier 23 automatically operates the gripping jaws 48 through which the stock projects to clamp the stock to the plate 44. It will, of course, be understood that rotation of the plate 44 successively brings the gripping jaws 46 into registration with a selected die 27 on the carrier 24, and also enables successively bringing the gripping jaws 48 into registration with a selected draw die 27 on the plate 23. The particular operation of the plates 44 and associated gripping jaws will be more fully hereinafter described.

Provision is made herein for alternately connecting opposite ends of a length of stock S to the drums 11 and 12. As shown in Figure 2 of the drawings each drum has a slot 50 extending axially of the drum from a point adjacent the end 30 of the drum to the opposite end of the latter. A fitting 51 has a head portion 52 which may be selectively engaged in the slots 50 in the drums and also has a clamp 53 connected to the head portion 52 by a flexible chain 54. The clamp 53 comprises a holder 55 and a pair of gripping jaws 56 slidably supported by the holder. The outer ends of the gripping jaws project through the corresponding end of the holder, and are fashioned to grip one end of the length of stock S as shown in Figure 7 of the drawings. The jaws are held in spaced relationship in the holder by a guide 58 secured to the holder between the jaws and having the opposite sides converging toward the outer ends of the jaws. The converging sides of the guide 58 provide bearing surfaces along which the jaws may slide into and out of gripping relationship with the stock. The construction is such that when a pull is applied to the clamp 53 or holder 55 in a direction away from the length of stock, the jaws 56 grip the stock with a force proportionate to the magnitude of the pull applied to the clamp. On the other hand when the pulling force is released, the gripping action of the jaws on the stock is relieved, permitting the jaws to be readily disengaged from the stock.

In the present instance the stock to be drawn is in the form of a substantially continuous length of tubing, and provision is made herein for maintaining the specified internal diameter of the tubing during the drawing operation. As shown in Figure 7 of the drawings, this is accomplished by inserting a drawn pin or plug 59 into one end of the tubular stock prior to projecting the latter through the draw die. The plug 59 has a reduced part 60 connected to the portion 61 of larger diameter by a tapered intermediate section 62. The diameter of the enlarged portion 61 is such as to permit the plug to be inserted into one end of the tubular stock prior to the drawing operation, and is sufficient to prevent drawing of the plug through the die. The diameter of the reduced portion 60 is such as to enable the same to assume a position within the restricted region of the draw die opening. In practice the plug 59 aligns itself with the die in such a manner that the metal of the stock must flow between the reduced portion 60 of the plug and the adjacent wall of the die. If desired a suitable spring 63 may be provided on the enlarged end 61 of the draw die in a manner to frictionally engage the inner surface of the tubular stock, and thereby hold the plug against accidental shifting movement rearwardly relative to the stock during the drawing operation.

Figure 1:
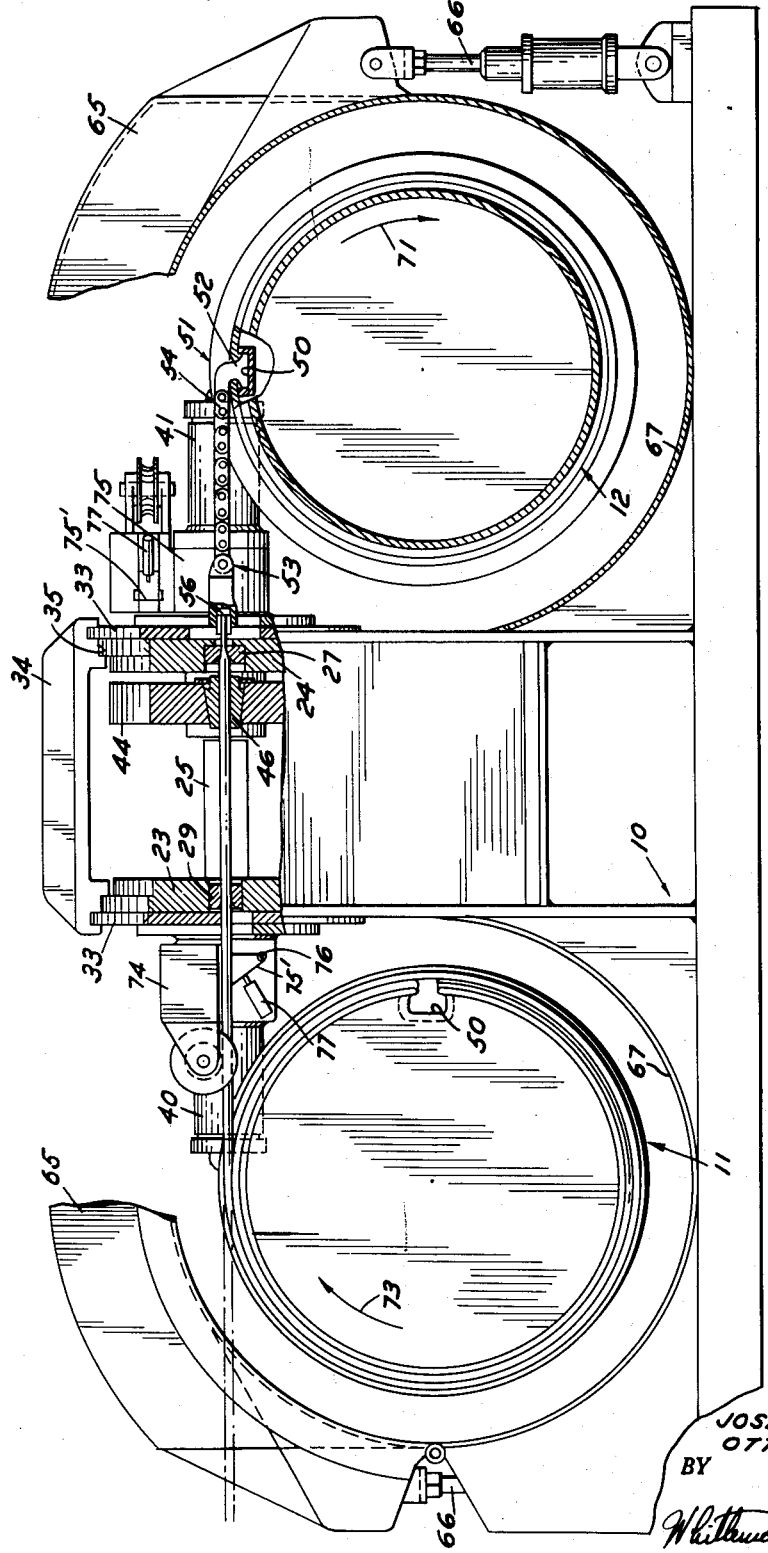
Figure 1 is an end elevational view partly in section of stock drawing apparatus embodying the features of this invention.

Also if desired the drums may be shielded during the drawing operation by guards 65. The guards 65 are shaped in the manner indicated in Figure 1 of the drawings to respectively extend over the top portions of the drums. These guards are diagrammatically shown as hinged at their lower ends to a part of the machine frame, and if desired may be power operated by fluid motors 66. It will further be noted from Figure 1 that the lower portions of the drums are shielded by fixed guards 67, which are secured to the machine frame in any suitable manner.

OPERATION

Assuming that the stock to be reduced is in the form of a relatively long length of tubing, the first step in the operation is to distribute lubricant within the end of the tubing to be attached to one of the drums. Any suitable means may be provided for introducing lubricant into the stock, such for example as lubricant supply nozzles 70, shown diagrammatically in Figure 2 of the drawings. In the present instance two nozzles 70 are supported on the portions of the machine frame between the drums adjacent the ends 30 of the drums. One nozzle faces the drum 11, and may be readily engaged by stock taken from the drum 11. The other nozzle 70 faces the drum 12, and may be readily engaged by stock taken from this drum. Both nozzles communicate with a source of lubricant, and are of the type which operate by merely pushing the stock against the same.

After lubricant has been distributed in one end of a length of straight tubular stock, a plug 59 of the proper size is inserted into the lubricated end of the stock, and this end with the plug therein is projected through the lowermost guide 28 on the carrier 23. It will of course be understood that the shaft 25 is previously rotated to relatively position the carriers so that the die 27 of maximum diameter on the carrier 24 and the aligned guide sleeve 29 on the carrier 23 assume positions in registration with the stock S. Fluid under pressure is then inserted into the outer end of the cylinder 41 and is exhausted from the outer end of the cylinder 40. As a result the plate 44 is moved in a direction toward the carrier 23, and the end of the stock is projected through the registering gripping jaws 46 on the plate 44. These gripping jaws are in their released position due to the direction of taper on the jaws 46 and the adjacent wall of the opening 45 through the plate 44. The end of the stock with the plug therein is advanced axially through the registering jaws 46 to a position at the entrant side of the registering draw die 27 which is the largest die of the group on the carrier 24.

Upon completion of the above operation, fluid under pressure is introduced into the outer end of the cylinder 40 and is exhausted from the outer end of the cylinder 41. As a result the plate 44 is moved by the shaft 25 in a direction toward the carrier 24. As the plate 44 moves toward the carrier 24, the gripping jaws 46 are actuated to firmly grip the stock so that the continued movement of the plate 44 in the above direction forces the end of the stock through the registering draw die 27. During this operation the plug 59 assumes its proper position in relation to the registering draw die 27, so that the tubular stock is supported during continued movement through the draw die 27.

The fitting 51 is assembled on the drum 12 and assumes a position at the end of the slot 50 adjacent the end 30 of the drum 12. When in this position the end of the stock previously projected through the draw die 27 is gripped by the clamp 53 on the fitting 51, and the drum 12 is driven in the direction of the arrow 71 by engaging the clutch 17 for this drum with the driving mechanism. The clutch for the drum 11 is disconnected so that the drum merely acts as an idler. As the drum 12 rotates in the direction of the arrow 71, the stock S is pulled through the draw die 27 and is coiled about the drum 12. It will be understood that prior to drawing the stock through the registering die 27 by the drum 12, the plate 44 is moved a sufficient distance toward the carrier 23 to relieve the clamping action of the registering jaws 46 on the stock, so that these jaws do not interfere with the drawing operation.

It is pointed out at this time that the peripheral surfaces of the drums are cylindrical for a limited distance from the ends 30 of the drums, and then taper slightly toward the axis of the drums. The arrangement is such that the cylindrical portions provide greater tractive effort on the stock, and the tapered portions relieve the gripping action of the stock against the drums. This is desirable in that it facilitates removing the coiled stock from the drums upon completion of the drawing operation.

In any event as the stock is coiled about the drum 12, the convolutions are fed along the drum 12 in a direction away from the end 30 of the drum, so that ample space is afforded adjacent the end 30 of the drum for receiving the stock being drawn through the registering die 27.

After the length of stock is coiled upon the drum 12 and the trailing end of the stock reaches the delivery side of the registering draw die 27, rotation of the drum 12 is discontinued by breaking the circuit to the electric motor 18. The clutch for the drum 12 is then released, and the shaft 25 is rotated to bring a guide bushing 29 on the carrier 24 into registration with the adjacent end of the stock on the drum 12. Also during this rotation of the shaft 25, the plate 44 is rotated to bring one of the gripping jaws 48 in alignment with the stock. Upon completion of this operation the inner end of the coiled stock on the drum 12 is projected through the registering bushing and gripping jaws 48, and the proper plug 59 is inserted into the inner end of the stock. It will be understood that prior to inserting the plug into the stock, the stock is engaged with the nozzle 70 adjacent the drum 12 to lubricate the inner surface thereof.

Rotation of the shaft 25 to register a guide bushing 29 on the carrier 24 with the stock also rotates the carrier 23 sufficiently to align a draw die 27 thereon with the stock. This draw die is of a smaller size than the die through which the stock initially was drawn.

After the stock is properly gripped by the jaws 48, fluid under pressure is admitted to the cylinder 41 and is exhausted from the cylinder 40 to move the plate 44 in a direction toward the carrier 23. As a result the inner end of the stock is projected through the registering die 27 on the carrier 23, and the plug 59 is properly aligned with the draw die. The end of the stock is then attached to the drum 11 by the fitting 51 which has previously been removed from the stock coiled on the drum 12, and the circuit to the motor 18 is closed. Also the clutch for the drum 11 is engaged, and the latter drum is rotated in the direction of the arrow 73 in Figure 1 of the drawings. As a result the stock is drawn off of the drum 12 through the registering draw die on the carrier 23, and is coiled about the drum 11 in the same manner as previously described in connection with the drum 12. As stated above the plate 44 is moved sufficiently toward the carrier 24 prior to operation of the drum 11, so that the stock is released by the clamping jaws 48 on the plate 44 during the drawing operation.

The above operation is repeated for each draw die on the carriers 23 and 24, so that the stock is successively drawn to a smaller diameter as it is transferred back and forth between the two drums. The stock remains on one or the other of the drums until the final draw is completed, whereupon it is removed in the form of a coil from one of the drums, and may be transferred to the shipping department or to the point of use.

In some instances it is possible that the ends of the stock may become deformed, and thereby render it difficult to insert the plug 59 prior to the drawing operations. In order to overcome this difficulty, a pair of cutters 74 and 75 are respectively rotatably supported on the cylinders 40 and 41. The arrangement is such as to enable the cutters to be swung out of position when not in use. The cutters may be of conventional construction, and are merely diagrammatically shown herein. Each cutter comprises a knife 75' pivoted as at 76 in a manner to swing across the path of travel of the stock and cut the same without interfering with advancement of the stock. In the present instance the knives 75' are selectively operated by fluid motors 77 through the medium of suitable controls not shown herein. It will suffice to point out that the knives may be selectively operated to cut off the deformed or damaged end of the stock prior to inserting the plug 59 in place.

The embodiment of the invention shown in Figures 8 to 11 inclusive differs principally from the foregoing construction in that a single carrier 80 is provided. The carrier 80 is splined on a sleeve 81, which in turn, is secured to a shaft 82. The shaft 82 corresponds to the shaft 25 previously described, and has the opposite ends projecting respectively into the cylinders 40' and 41'. Pistons 42' are respectively slidably supported in the cylinders 41' and are secured to the shaft for reciprocating the latter in a manner similar to the shaft 25. The carrier 80 is formed with a plurality of openings 83 therethrough adjacent the periphery thereof, and draw dies 84 are respectively secured within the openings 83 in a manner such that adjacent dies face in opposite directions.

Secured to the sleeve 81 at opposite sides of the carrier 80 are plates 86 and 87. The plate 86 has a plurality of openings 88 therethrough arranged in alignment with the draw dies 84 in the carrier 80 which face the drum 11, and gripping jaws 89 are respectively secured within the openings 88. The walls of the openings 88 diverge in a direction toward the carrier 80 and the adjacent walls of the gripping jaws are correspondingly tapered. The arrangement is such that movement of the plate 86 by the sleeve 81 in a direction toward the carrier 80 causes the jaws to securely grip a length of stock extending therethrough. If desired suitable bushings 90 may be secured to the plate 86 in positions to respectively register with the outer ends of the gripping jaws 89 and guide the stock into the latter.

The plate 87 has a plurality of openings 91 therethrough, and these openings are respectively aligned with the draw dies 84 in the carrier 80 which face the drum 12. Suitable gripping jaws 92 are respectively supported within the openings 91, and function in the same manner as the jaws 89 upon movement of the plate 87 by the sleeve 81 in a direction toward the carrier 80.

The above construction is such that the gripping jaws 89 on the plate 86 operate successively to project the end of the stock from the drum 11 through the registering draw die 84 in the carrier 80 toward the drum 12, and the gripping jaws 92 on the plate 87 operate to project the end of the stock from the drum 12 through the registering draw die on the carrier 80 toward the drum 11. The plates 86 and 87 rotate as a unit with the carrier 80 so that the gripping jaws on the plates are always in alignment with the draw dies on the carrier 80. It is also pointed out that the draw dies on the carrier 80 progressively decrease in size to enable successively reducing the stock as it is moved back and forth between the drums.

In the event the stock being drawn breaks for some reason or another, it will be necessary to remove the coils from the associated drum in order to enable disconnecting the clamp 53 from the broken portion of the stock and to engage this clamp with the stock in advance of the broken portion. In order to facilitate this operation, a pair of supporting drums 100 and 101 are respectively positioned in axial alignment with the outer ends of the drums 11 and 12. The supporting drums, in effect, form a continuation of the adjacent coiling drums, and thereby enable shifting the broken portion of the stock on either drum, so that should the stock being coiled on either drum become broken, this stock would be shifted onto one of the supporting drums, thus rendering it possible to remove the clamp 53 from the broken portion of the stock and engaging the same with the length of stock to be drawn.

What we claim as our invention is:

1. Die mechanism for successively drawing stock in opposite directions comprising a pair of spaced carriers, means mounting the carriers for rotation about a common axis extending generally parallel to the fixed path of a length of stock in a drawing operation, a group of draw dies of different size facing in one direction and supported on one carrier in positions to successively register with said fixed path upon rotation of the said one carrier, a second group of draw dies of sizes different from each other and from the draw dies in the first group, said second group of dies facing in the opposite direction and supported on the other carrier in positions to successively register with said fixed path upon rotation of said other carrier, and said carriers being constructed at locations intermediate said dies for by-passing a carrier when a die of the other carrier is being used.

2. The mechanism defined in claim 1 having gripping means supported between the carriers for movement in opposite directions along said fixed path and alternately engageable with the ends of the stock, and means for moving the gripping means toward either of said carriers to push point the stock through a selected die of said carrier.

3. The die mechanism defined in claim 1, including guide bushings supported on the said one carrier and respectively axially aligned with the draw dies of the said other carrier, and guide bushings supported on the said other carrier and respectively axially aligned with the draw dies of the said one carrier, said carriers being operatively interconnected for rotation as a unit.

4. The mechanism defined in claim 2, said gripping means comprising a support mounted for rotation as a unit with said carriers and having clamping jaws respectively operable to apply a pushing force toward the draw dies of one carrier, and additional clamping jaws respectively operable to apply a pushing force toward the draw dies of the other carrier.

5. Die mechanism for successively drawing stock in opposite directions comprising a group of draw dies of different sizes facing in one direction, a carrier supporting said group of dies and operative to move said dies transversely of the fixed path of a length of stock in a drawing operation to successively register said dies with said fixed path, a second group of draw dies spaced from the first and being of sizes different from each other and from the dies of the first group, the dies of said second group facing in the opposite direction, a carrier supporting said second group of dies and operative to move the dies of said second group transversely of said fixed path to successively register the dies of said second group with said fixed path, said carriers being constructed at locations intermediate the dies for by-passing a carrier when a die of the other carrier is being used.

6. The mechanism defined in claim 1, including pivotal mountings for said carriers to assure alignment of said dies with said fixed path.

7. Die mechanism for successively drawing stock in opposite directions comprising a plurality of draw dies of different sizes facing in opposite directions, carrier means for said dies operative to move said dies across the fixed path of a length of stock in a drawing operation to successively register oppositely facing dies with said fixed path, a gripper associated with the dies facing in one direction and a second gripper associated with the dies facing in the opposite direction, said grippers being supported for movement along said fixed path and alternately engageable with the ends of the stock, and means for moving said grippers along said fixed path to push point the stock through a selected die.

8. The die mechanism defined in claim 5 having gripping means supported between the carriers for movement in opposite directions along said fixed path and alternately engageable with the ends of the stock, and means for moving the gripping means toward either of said carriers to push point the stock through a selected die of said carrier.

9. The die mechanism defined in claim 5 including pivotal mountings for said carriers to assure alignment of said dies with said fixed path.

10. Die mechanism for successively drawing stock in opposite directions comprising a plurality of draw dies of different sizes facing in opposite directions, a carrier for said dies operative to move said dies across the fixed path of a length of stock in a drawing operation to successively register oppositely facing dies with said fixed path, gripping means at opposite sides of the carrier for alternately engaging the ends of the stock, and means for successively moving the gripping means in opposite directions along said fixed path to project the stock through the die on the carrier registering with said fixed path.

11. Die mechanism for successively drawing stock in opposite directions comprising a plurality of draw dies of different sizes facing in opposite directions, carrier means for said dies operative to move said dies across the fixed path of a length of stock in a drawing operation to successively register oppositely facing dies with said fixed path, gripper means supported for movement along said fixed path and alternately engageable with the opposite ends of the stock, and means for moving said gripper means in opposite directions along said fixed path to push point the stock through a selected die.

References Cited in the file of this patent

UNITED STATES PATENTS

| Number | Name | Date |
|---|---|---|
| 1,085,664 | Carroll | Feb. 3, 1914 |
| 1,323,282 | Horton | Dec. 2, 1919 |
| 1,379,181 | Gore | May 24, 1921 |
| 1,414,380 | Sommer | May 2, 1922 |
| 1,605,281 | Reece | Nov. 2, 1926 |
| 1,629,524 | Nullmeyer | May 24, 1927 |
| 1,697,863 | Green | Jan. 8, 1929 |
| 1,697,888 | Tippet | Jan. 8, 1929 |
| 1,812,359 | Moltrup | June 30, 1931 |
| 2,138,327 | Richards | Nov. 29, 1938 |
| 2,139,539 | Bradley et al. | Dec. 6, 1938 |
| 2,196,646 | Smith | Apr. 9, 1940 |
| 2,199,602 | Wright | May 7, 1940 |
| 2,355,734 | Katz | Aug. 15, 1944 |